United States Patent
Fujiwara et al.

(10) Patent No.: US 8,809,736 B2
(45) Date of Patent: Aug. 19, 2014

(54) ARC WELDING METHOD AND ARC WELDING APPARATUS

(75) Inventors: Junji Fujiwara, Osaka (JP); Yasushi Mukai, Osaka (JP); Atsuhiro Kawamoto, Hyogo (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 153 days.

(21) Appl. No.: 13/063,815

(22) PCT Filed: Jul. 12, 2010

(86) PCT No.: PCT/JP2010/004506
§ 371 (c)(1),
(2), (4) Date: Mar. 14, 2011

(87) PCT Pub. No.: WO2011/013305
PCT Pub. Date: Feb. 3, 2011

(65) Prior Publication Data
US 2012/0145691 A1    Jun. 14, 2012

(30) Foreign Application Priority Data
Jul. 29, 2009  (JP) ................................. 2009-176137

(51) Int. Cl.
| | | |
|---|---|---|
| B23K 9/10 | (2006.01) | |
| B23K 9/28 | (2006.01) | |
| B23K 9/12 | (2006.01) | |
| B23K 9/073 | (2006.01) | |
| B23K 9/095 | (2006.01) | |

(52) U.S. Cl.
CPC ............... B23K 9/073 (2013.01); B23K 9/124 (2013.01); B23K 9/0732 (2013.01); B23K 9/0956 (2013.01)
USPC .................................. 219/130.31; 219/137.2

(58) Field of Classification Search
USPC ........ 219/130.1–130.51, 136, 137 R, 137 PS, 219/137.2–137.71
See application file for complete search history.

(56) References Cited

U.S. PATENT DOCUMENTS

| | | | |
|---|---|---|---|
| 4,717,807 A | 1/1988 | Parks et al. | |
| 4,835,360 A | 5/1989 | Parks et al. | |
(Continued)

FOREIGN PATENT DOCUMENTS

| | | | |
|---|---|---|---|
| CN | 1033448 A | 6/1989 | |
| CN | 10380157 A | 11/2002 | |
(Continued)

OTHER PUBLICATIONS

International Search Report for International Application No. PCT/JP2010/004506, Oct. 19, 2010, Panasonic Corporation.

(Continued)

*Primary Examiner* — Sang Y Paik
(74) *Attorney, Agent, or Firm* — RatnerPrestia

(57) ABSTRACT

An arc welding method of the present invention controls a short-circuit current increasing gradient (di/dt), an inflection point at which the short-circuit current increasing gradient (di/dt) changes, the current in a peak period and in a base period, and the time of the peak period in accordance with a difference between a set voltage and an output voltage. This allows the output voltage to be matched with the set voltage, and stabilizes the arc. Thereby, a stable arc welding method can be implemented, even as a method for outputting a welding current based on a welding voltage.

25 Claims, 7 Drawing Sheets

(56) References Cited

U.S. PATENT DOCUMENTS

| | | | |
|---|---|---|---|
| 4,866,247 A | 9/1989 | Parks et al. | |
| 4,897,523 A | 1/1990 | Parks et al. | |
| 4,972,064 A | 11/1990 | Stava | |
| 4,984,221 A | 1/1991 | Dennis | |
| 5,001,326 A | 3/1991 | Stava | |
| 5,003,154 A * | 3/1991 | Parks et al. | 219/137 PS |
| 5,148,001 A * | 9/1992 | Stava | 219/137 PS |
| 6,225,597 B1 * | 5/2001 | Kawamoto et al. | 219/130.51 |
| 6,335,511 B1 * | 1/2002 | Rothermel | 219/130.51 |
| 6,498,321 B1 | 12/2002 | Fulmer et al. | |
| 2006/0138115 A1 * | 6/2006 | Norrish et al. | 219/137.71 |
| 2006/0283847 A1 * | 12/2006 | Kawamoto et al. | 219/137 PS |
| 2009/0152252 A1 * | 6/2009 | Kawamoto et al. | 219/130.51 |
| 2011/0248012 A1 | 10/2011 | Fujiwara | |

FOREIGN PATENT DOCUMENTS

| | | |
|---|---|---|
| CN | 101406983 A | 4/2009 |
| JP | 60-082271 | 5/1985 |
| JP | 60-082272 | 5/1985 |
| JP | 62-006775 | 1/1987 |
| JP | 03-094977 | 4/1991 |
| JP | 03-204177 | 9/1991 |
| JP | 2534374 B2 | 6/1996 |
| JP | 2733624 B2 | 1/1998 |
| WO | WO 2010/116695 A1 | 10/2010 |

OTHER PUBLICATIONS

Chinese Search Report for Application No. 201080003935.5, dated Aug. 26, 2013.

* cited by examiner

Short-circuit current increasing gradient (in a first step) $di_1/dt(IS1)$

Current value ISC at short-circuit current inflection point

ARC WELDING METHOD AND ARC WELDING APPARATUS

This Application is a U.S. National Phase Application of PCT International Application PCT/JP2010/004506.

TECHNICAL FIELD

The present invention relates to an arc welding control method and an arc welding apparatus for welding by alternately generating a short-circuit state and an arc state while repeating a forward feed and a reverse feed of a welding wire as a consumable electrode.

BACKGROUND ART

In order to reduce a spatter-removing step, which is a loss step in a welding process, reducing spatters is intended. A conventionally known method for this purpose is a consumable electrode type arc welding method for alternately generating a short-circuit state and an arc state while repeating a forward feed and a reverse feed at a welding wire feeding speed.

FIG. 9 is a diagram showing time waveforms of a wire feeding speed and a welding output with respect to a temporal change in a conventional arc welding control method.

For example, as an arc welding control method for welding by alternately generating a short-circuit state and an arc state while feeding a welding wire as a consumable electrode, the following method is known. In this method, a feeding speed controller and an output controller are used. The feeding speed controller controls a wire feeding motor such that a forward feed and a reverse feed are periodically repeated at a wire feeding speed. Upon receiving an increase/decrease signal from the feeding speed controller, the output controller performs control such that the welding output is low in the period during which the wire feeding amount is small and the welding output is high in the period during which the wire feeding amount is large as shown in FIG. 9. With this operation, in the short-circuit state, the releasing force resulting from the reduction of the wire feeding speed can be used to transfer the wire fusion mass. Thus, even when short-circuit current, which is a primary cause of spatters, is reduced, a stable short-circuiting transfer welding can be maintained (see Patent Literature 1, for example).

In a typical arc welding control, the following control is performed. A wire feeding speed corresponding to a set current is output as a fixed speed, and the welding current is output based on the welding voltage in the arc period such that the output voltage is matched with the set voltage.

According to the technique disclosed in Patent Literature 1, the welding output is increased or decreased by periodically repeating forward feed Z1 and reverse feed Z2 at a wire feeding speed as shown in FIG. 9. Thus, in the control method of setting the welding output low in the period during which the wire feeding amount is small and setting the welding output high in the period during which the wire feeding amount is large, a short-circuit period and an arc period occur at a fixed ratio in one short circuit cycle. This stabilizes the arc and thus can reduce spatters. However, it is considered difficult to match the welding voltage with the set voltage, with the use of a method for outputting the welding current based on the welding voltage, i.e. a typical constant voltage control in the arc period. This is because the arc period is fixed and thus the welding voltage needs to be controlled within a predetermined time period. Raising a gain in order to forcedly control the welding voltage causes large variations in the arc length, which can lead to an unstable arc. For these reasons, the stable control of welding current and welding voltage is difficult.

CITATION LIST

[Patent Document] Japanese Patent Unexamined Publication No. S62-6775

SUMMARY OF INVENTION

The present invention is directed to address the above problem. The present invention provides a method for stably controlling a welding voltage, and an apparatus for implementing the method, in an arc welding control method for welding by periodically generating a short-circuit state and an arc state while periodically repeating a forward feed and a reverse feed at a wire feeding speed.

In an arc welding method for welding using a welding wire as a consumable electrode by repeating a short-circuit state and an arc state, the arc welding method of the present invention includes:
performing control such that the voltage value of an output voltage is matched with the voltage value of a set voltage by
determining a short-circuit current increasing gradient corresponding to a set current; and
temporally changing the short-circuit current increasing gradient corresponding to the set current, based on the difference between the set voltage and the output voltage.

This method allows the output voltage to be matched with the set voltage, thereby controlling the welding voltage stably.

In an arc welding apparatus for welding by repeating an arc state and a short-circuit state between a welding wire as a consumable electrode and an object to be welded, the arc welding apparatus of the present invention includes the following elements:
a switching element for controlling an welding output;
a welding voltage detector for detecting a welding voltage;
a status detector for detecting a short-circuit state or an arc state, based on the output from the welding voltage detector;
a short-circuit controller for controlling a short-circuit current in a short-circuit period, upon receiving a short-circuit signal from the status detector;
an arc controller for controlling an arc voltage in an arc period, upon receiving an arc signal from the status detector;
a set current setting section for setting a set current; and
a set voltage setting section for setting a set voltage.

The short-circuit controller includes the following elements:
an increasing gradient base setting section for determining a short-circuit current increasing gradient, based on a set current set by an operator; and
an increasing gradient controller for changing the short-circuit current increasing gradient determined in the increasing gradient base setting section, based on the difference between the voltage set by the set voltage setting section and the voltage detected in the welding voltage detector. The short-circuit controller changes the short-circuit current increasing gradient, based on the difference between the set voltage set in the set voltage setting section and the voltage detected in the welding voltage detector.

This structure allows the output voltage to be matched with the set voltage, thereby controlling the welding voltage stably.

In an arc welding apparatus for welding by repeating an arc state and a short-circuit state between a welding wire as a consumable electrode and an object to be welded, the arc welding apparatus of the present invention includes:
a switching element for controlling an welding output;
a welding voltage detector for detecting a welding voltage;
a status detector for detecting a short-circuit state or an arc state, based on the output from the welding voltage detector;
a short-circuit controller for controlling a short-circuit current in a short-circuit period, upon receiving a short-circuit signal from the status detector;
an arc controller for controlling an arc voltage in an arc period, upon receiving an arc signal from the status detector;
a set current setting section for setting a set current; and
a set voltage setting section for setting a set voltage.

The short-circuit controller includes the following elements:
an increasing gradient base setting section for determining a short-circuit current increasing gradient in a first step and a short-circuit current increasing gradient in a second step, based on a set current set by an operator;
an inflection point base setting section for determining an inflection point at which the short-circuit current increasing gradient changes from the short-circuit current increasing gradient in the first step to the short-circuit current increasing gradient in the second step, based on the set current set by the operator;
an increasing gradient controller for changing the short-circuit current increasing gradient in the first step and the short-circuit current increasing gradient in the second step determined in the increasing gradient base setting section, based on the difference between the voltage set in the set voltage setting section and the voltage detected in the welding voltage detector; and
an inflection point controller for changing the inflection point of the short-circuit current increasing gradient determined in the inflection point base setting section, based on the difference between the voltage set in the set voltage setting section and the voltage detected in the welding voltage detector. Based on the difference between the set voltage set in the set voltage setting section and the voltage detected in the welding voltage detector, the short-circuit controller changes at least one of the short-circuit current increasing gradient in the first step, the short-circuit current increasing gradient in the second step, and the current value at the inflection point.

This structure allows the output voltage to be precisely matched with the set voltage, thereby controlling the welding voltage more stably.

As described above, in accordance with the present invention, in a control method for welding by generating a short-circuit state and an arc state, the short-circuit current increasing gradient, the inflection point at which the short-circuit current increasing gradient changes, the current values in the peak period and in the base period, and the time of the peak period are controlled. This can temporally change the ratio between the short-circuit period and the arc period, thereby allowing the output voltage to be matched with the set voltage. Therefore, the welding voltage can be controlled stably.

This method is a control method for welding by generating a short-circuit state and an arc state by periodically repeating a forward feed and a reverse feed at a wire feeding speed. The forward feed and the reverse feed at the wire feeding speed are based on a sine waveform or a trapezoidal waveform. Thus, the load on the peripheral components around the motor, such as a feeding motor and gears, can be reduced.

DETAILED DESCRIPTION OF THE PREFERRED EMBODIMENT

Hereinafter, a description is provided for the exemplary embodiments of the present invention with reference to the accompanying drawings. In the following drawings, the same elements are denoted with the same reference marks, and the description of these elements is omitted in some cases. The present invention is not limited by these exemplary embodiments.

First Exemplary Embodiment

In this embodiment, a welding control method is described first, and a welding apparatus is described thereafter.

Figure 1:
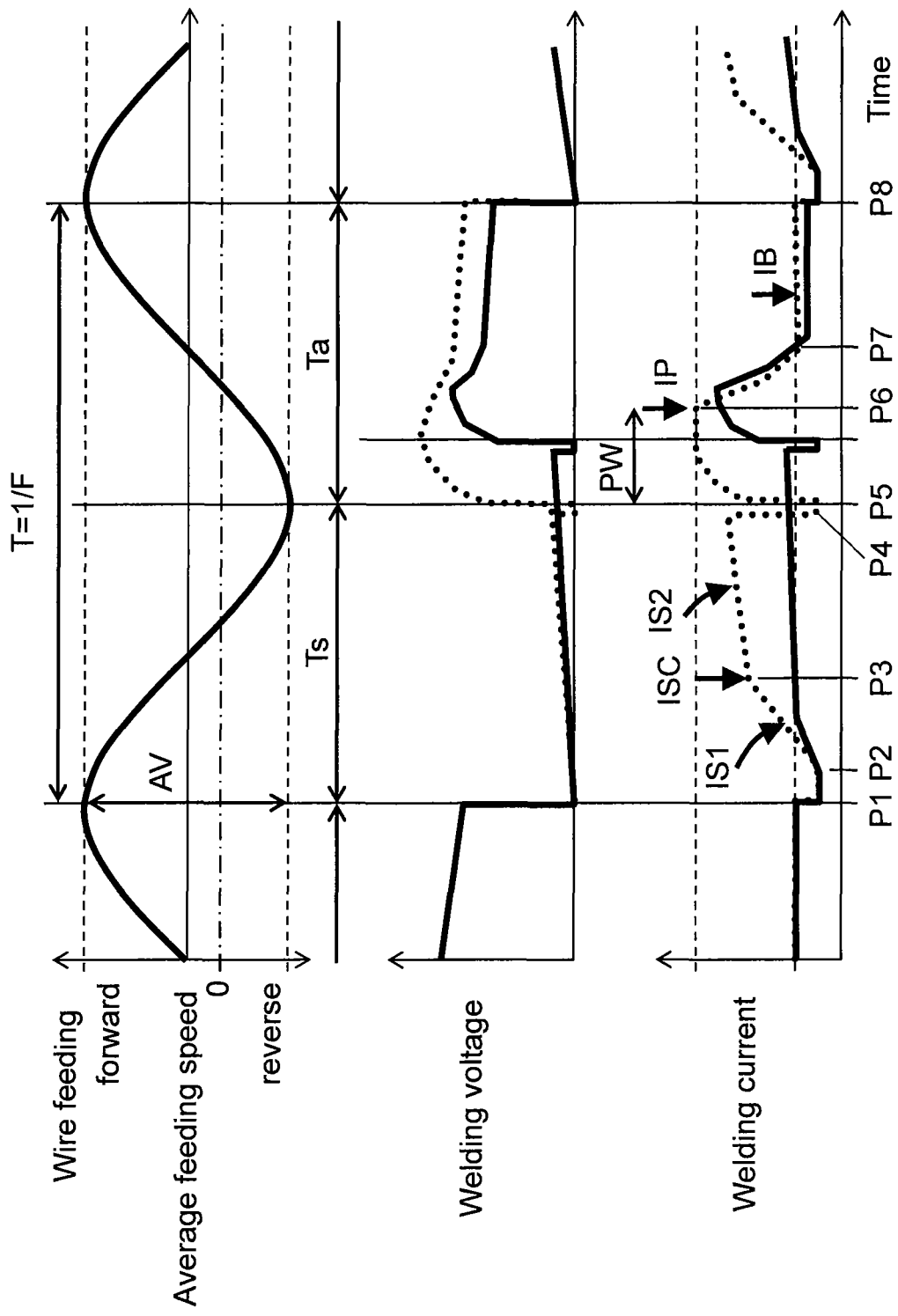
FIG. 1 is a diagram showing time waveforms of a wire feeding speed, a welding voltage, and a welding current in accordance with a first exemplary embodiment of the present invention.
Figure 2:
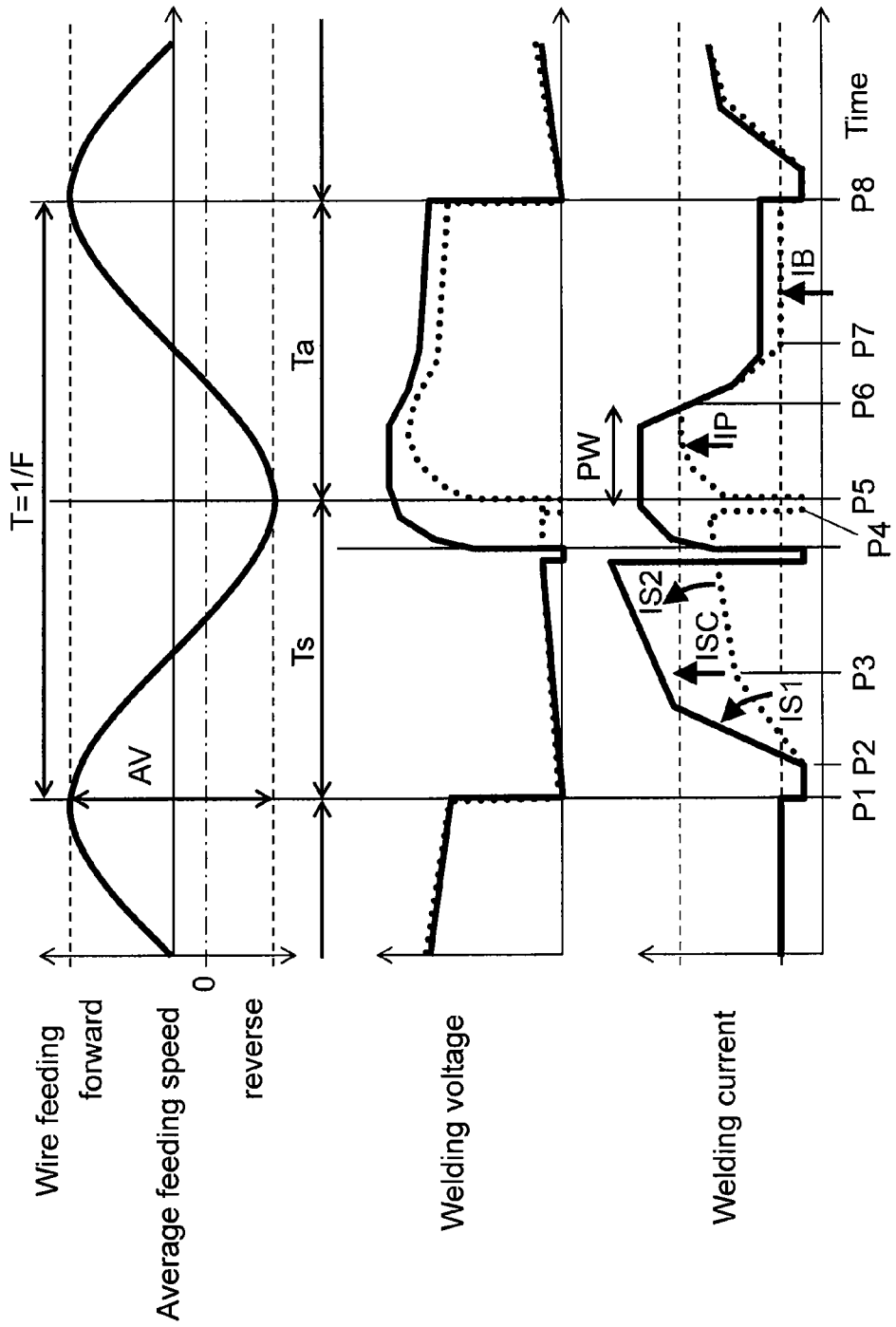
FIG. 2 is a diagram showing time waveforms of a wire feeding speed, a welding voltage, and a welding current in accordance with the first exemplary embodiment of the present invention.

FIG. 1 and FIG. 2 each shows time waveforms of a wire feeding speed, a welding voltage, and a welding current in a consumable electrode type arc welding for alternately repeating a short-circuit state and an arc state.

In each of FIG. 1 and FIG. 2, P1 shows a time point at which a short circuit starts, and is also a time point at which a short-circuit initial time starts. P2 shows a time point at which the short-circuit initial time ends. P2 is also a time point at which the output with a short-circuit current increasing gradient (di/dt), i.e. the amount of increase in the short-circuit current per unit time, starts. P3 is a time point of the inflection point of a short-circuit current increasing gradient ($di_1/dt$) in a first step and a short-circuit current increasing gradient ($di_2/dt$) in a second step. P4 shows a time point at which the output with the short-circuit current increasing gradient ($di_2/dt$) in the second step ends. P4 is also a time point at which the constriction of a droplet formed between a molten pool and the top end of a welding wire is detected and the current instantaneously drops. P5 is a time point at which the constriction of the droplet is released, the short-circuit state ends, and an arc occurs. P5 is also a time point at which the output of the welding current at the peak current starts immediately after the occurrence of the arc. P6 is a time point at which the transition from the peak current to a base current is started. In the period from P6 to P7, either a current control or a voltage control may be used. From time point P7, the base current is output. P8 shows a time point at which a next short circuit occurs.

The wire feeding control shown in FIG. 1 and FIG. 2 is a wire feeding control of periodically repeating a forward feed and a reverse feed in a sine waveform as a basic waveform at a predetermined frequency with a predetermined amplitude. Therefore, a short circuit occurs in the vicinity of P1 at the peak on the forward feed side, while an arc occurs in the vicinity of P5 at the peak on the reverse feed side. In this manner, the occurrence of the short-circuit state or the arc state basically depends on the wire feeding control of periodically repeating the forward feed and the reverse feed at a wire feeding speed.

FIG. 1 shows a case where control of immediately reducing the output voltage is desired when the output voltage is larger than a set voltage. That is, this case shows an example of control in one cycle of a short circuit in the following manner. The short-circuit current gradient (di1/dt) in the first step (hereinafter, referred to as "IS1" shown in FIG. 1), the short-circuit current increasing gradient (di2/dt) in the second step (hereinafter, "IS2" shown in FIG. 1), the current value ("ISC" shown in FIG. 1) at the inflection point at which short-circuit current gradient IS1 in the first step changes to short-circuit current increasing gradient IS2 in the second step, the peak current, the peak time, and the base current are made smaller than the respective reference values corresponding to the set current.

The output voltage can be obtained by calculating an average value of those in a plurality of cycles, or by averaging a plurality of average values of the voltages in predetermined periods.

FIG. 2 shows a case where control of immediately raising the output voltage is desired when the output voltage is smaller than the set voltage. That is, this case shows an example of control in one cycle of a short circuit in the following manner. Short-circuit current gradient IS1 in the first step, short-circuit current increasing gradient IS2 in the second step, the current value (ISC) at the inflection point at which short-circuit current gradient IS1 in the first step changes to short-circuit current increasing gradient IS2 in the second step, the peak current, the peak time, and the base current are made larger than the respective reference values corresponding to the set current.

In FIG. 1 and FIG. 2, the current waveform and the voltage waveform when the output voltage is matched with the set voltage are shown by broken lines as basic waveforms. An example of control by constant voltage control of matching the output voltage with the set voltage is shown by solid lines.

First, hereinafter, a description is provided for basic control in one cycle of a short circuit, i.e. a period from P1 to P8 shown by the broken lines in FIG. 1 and FIG. 2.

At a time point in the vicinity of P1, at the peak of a forward feed in wire feeding control in a sine waveform, a welding wire makes contact with an object to be welded and a short circuit occurs. In the short-circuit initial time from P1 to P2, a short-circuit initial current is output. The short-circuit initial current is lower than the current at the time immediately before P1 at which the short circuit occurs.

Here, a description is provided for the purpose of setting the current low in the short-circuit initial time from P1 to P2. When the short-circuit current is increased toward a high current immediately after the occurrence of a short circuit, the short circuit is immediately opened, and immediately thereafter, a short circuit can occur again. Such a phenomenon breaks the periodicity of short circuits. Then, a period where a low current is output is set immediately after the occurrence of the short circuit so as to ensure a short-circuit state. After such a short-circuit state is ensured, control of increasing the short-circuit current toward a high current can be performed.

The short-circuit initial time and the short-circuit initial current value are derived from experimental verifications, for example, and used. As the base set values of these short-circuit initial time and the short-circuit initial current, proper values derived from experimental verifications are used such that stable welding is possible at a welding speed (1 m/min in this embodiment), when the ratio between the short-circuit period and the arc period is 50%. The short-circuit initial time and the short-circuit initial current value are stored in a storage, which is not shown, as a table, for example, such that these values correspond to a set current.

Next, at time point P2, short-circuit current increasing gradient IS1 in the first step is determined based on the set current, in a state where the short circuit between the welding wire and an object to be welded is ensured. Along short-circuit current increasing gradient IS1 in the first step, the actual short-circuit current rises and reaches current value ISC at a short-circuit current inflection point at time point P3. Then, the actual short-circuit current increases along short-circuit current increasing gradient IS2 in the second step that is determined based on the set current. As the base set values of short-circuit current increasing gradient IS1 in the first step, short-circuit current increasing gradient IS2 in the second step, and current value ISC at the short-circuit current inflection point, proper values derived from experimental verifications are used such that stable welding is possible at a welding speed (1 m/min in this embodiment), when the ratio between short-circuit period Ts and arc period Ta is 50%. These short-circuit current increasing gradient (di/dt) and the inflection point are stored in a storage, which is not shown, as a table or a formula, for example, such that these values correspond to the set current. Frequency F for wire feeding is expressed by the inverse number of the sum (period T) of short-circuit period Ts and arc period Ta. The sum of the forward feed and the reverse feed is expressed by amplitude velocity AV.

Next, from P4 to P5, as conventionally known, control of detecting the constriction of the molten welding wire and sharply reducing the short-circuit current is performed.

Next, in the vicinity of P5, at the peak of the reverse feed in the wire feeding control in the sine waveform, the welding wire is released from the object to be welded and the short circuit is opened. In the arc period from P5 to P6, by current control, the current is increased with a predetermined gradient to peak current IP from P5, i.e. the initial time point of the occurrence of an arc. When the output of peak current IP needs to be kept, the peak current can be kept for the required time period.

Next, from P6 to P7, a welding current corresponding to the welding voltage may be output by voltage control, or a predetermined current may be output by current control. In either control, it is necessary to grow the droplet and stably keep a proper arc length.

Next, from P7 to P8, the state of base current IB is kept by current control and the occurrence of a next short circuit at P8 is waited for. In the vicinity of P8, at the peak of the forward feed by the wire feeding control in the sine waveform, the welding wire makes contact with the object to be welded and thereby a short circuit occurs. Keeping the state of base current IB advantageously ensures a state where a short circuit is likely to occur, and prevents generation of large spatters even when a small short circuit occurs because the welding current is low.

Peak current IP and peak current time PW from P5 to P6, and base current IB from P7 to P8 are derived from experimental verifications, for example, and used. Further, as the base set values of these peak current IP, peak current time PW, and base current IB, proper values derived from experimental verifications are used such that stable welding is possible at a welding speed (1 m/min in this embodiment), when the ratio between short-circuit period Ts and arc period Ta is 50%. Peak current IP, peak current time PW, and base current IB are stored in a storage, which is not shown, as a table, for example, such that these values correspond to the set current.

As described above, the control from P1 to P8 is set as one cycle, and these cycles are repeated for welding.

Hereinafter, a description is provided for control of temporally making automatic adjustment such that an output voltage is matched with a set voltage as shown in FIG. 1 and FIG. 2.

In the wire feeding control, a wire is fed while a forward feed and a reverse feed are periodically repeated at a predetermined frequency with a predetermined amplitude in a sine waveform. The waveform in this state is a basic waveform.

Since the wire is periodically fed, the output voltage can be controlled by the control of the ratio between a short-circuit period and an arc period in one cycle of the short circuit.

For example, in mild steel MAG welding, the set current is 120 A, the short-circuit period is 50%, the arc period is 50%, and the voltage is 15V. In this case, adjusting the short-circuit period to 40% and the arc period to 60% can change the voltage to 17 V. In contrast, adjusting the short-circuit period to 60% and the arc period to 40% can change the voltage to 13 V. Thus, the voltage can be largely controlled based on the ratio between the short-circuit period and the arc period.

The output voltage can be matched with the set voltage by temporally controlling the ratio between the short-circuit period and the arc period every several microseconds or several tens of microseconds.

When the short-circuit period is lengthened so as to lower the voltage as shown in FIG. 1, short-circuit current increasing gradients IS1 and IS2 in the first step and in the second step, respectively, and ISC at the inflection point of the short-circuit current increasing gradients are reduced. This opens the short circuit later and lengthens the short-circuit period.

Reducing peak current IP and base current IB in arc period Ta can shorten the arc length, thus shortening arc period Ta.

As described above, when the output current is larger than the set current in the welding period, the following control is performed. That is, short-circuit current gradient IS1 in the first step, short-circuit current increasing gradient IS2 in the second step, current value ISC at the inflection point at which the short-circuit current gradient in the first step changes to the short-circuit current increasing gradient in the second step, and peak current IP and base current IB in arc period Ta are reduced. This can lengthen short-circuit period Ts and shorten arc period Ta, thereby temporally making automatic adjustment such that the output voltage is lowered.

In contrast, when short-circuit period Ts is shortened so as to raise the voltage, as shown in FIG. 2, the following control is performed. That is, short-circuit current increasing gradients IS1 and IS2 in the first step and in the second step, respectively, and ISC at the inflection point of the short-circuit current increasing gradients are set larger than those corresponding to the set current. This can open the short circuit earlier and shorten short-circuit period Ts.

Peak current IP and base current IB in arc period Ta set larger than those corresponding to the set current can increase the arc length, thus lengthening arc period Ta.

As described above, when the output voltage is smaller than the set voltage in the welding period, the following control is performed. That is, short-circuit current gradient IS1 in the first step, short-circuit current increasing gradient IS2 in the second step, current value ISC at the inflection point at which the short-circuit current gradient in the first step changes to the short-circuit current increasing gradient in the second step, and peak current IP and base current IB in arc period Ta are increased. This can shorten short-circuit period Ts and lengthen arc period Ta, thereby temporally making automatic adjustment such that the output voltage is raised.

Examples of the automatic adjustment include the following methods. The voltage difference value is correlated with short-circuit current gradient IS1 in the first step, short-circuit current increasing gradient IS2 in the second step, and current value ISC at the inflection point, and these values are stored in a storage, which is not shown. Further, in accordance with the voltage difference value, short-circuit current gradient IS1 in the first step, short-circuit current increasing gradient IS2 in the second step, and current value ISC at the inflection point are determined. Alternatively, formulas for correlating the voltage difference value with short-circuit current gradient IS1 in the first step, short-circuit current increasing gradient IS2 in the second step, and current value ISC at the inflection point are stored in a storage, which is not shown. Further, in accordance with the voltage difference value, the short-circuit current increasing gradient (di/dt) and current value ISC at the inflection point are determined.

Peak current IP, peak current time PW, and base current IB may be stored in the storage and determined in a manner similar to the above short-circuit current gradient IS1 in the first step, short-circuit current increasing gradient IS2 in the second step, and current value ISC at the inflection point.

That is, the arc welding method of the present invention is an arc welding method for welding using a welding wire as a consumable electrode by repeating a short-circuit state and an arc state. The arc welding method includes performing control such that the voltage value of an output voltage is matched with the voltage value of a set voltage by determining a short-circuit current increasing gradient corresponding to a set current; and temporally changing the short-circuit current increasing gradient (di/dt) corresponding to the set current, based on the difference between the set voltage and the output voltage.

This method allows the output voltage to be matched with the set voltage, thereby controlling the welding voltage stably.

Alternatively, the following method can be used. When the output voltage is smaller than the set voltage, the short-circuit current increasing gradient (di/dt) is changed so as to be steeper than the short-circuit current increasing gradient (di/dt) corresponding to the set current. Further, when the output voltage is larger than the set voltage, the short-circuit current increasing gradient (di/dt) is changed so as to be gentler than the short-circuit current increasing gradient (di/dt) corresponding to the set current.

This method can stably control the welding voltage more precisely.

Alternatively, the following method can be used. The short-circuit current increasing gradient (di/dt) is changed in proportion to an absolute value corresponding to the value of the difference between the set voltage and the output voltage, or changed to a value that is based on the rate of change corresponding to the value of the difference between the set voltage and the output voltage.

This method can stably control the welding voltage much more precisely.

Figure 3:
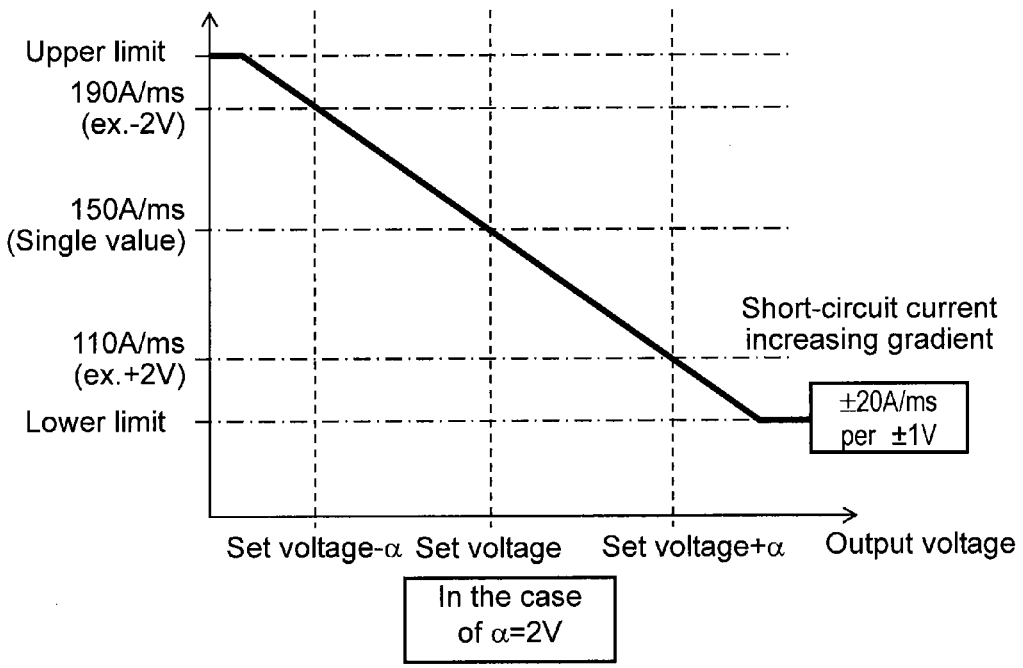
FIG. 3 is a graph showing an example of the relation of a short-circuit current increasing gradient with respect to an output voltage in accordance with the first exemplary embodiment of the present invention.

Next, hereinafter, a description is provided for an example of the control of the short-circuit current increasing gradient (di/dt) with reference to FIG. 3. FIG. 3 is a graph showing an example of the relation of a short-circuit current increasing gradient (di/dt) with respect to an output voltage in accordance with the first exemplary embodiment of the present invention. As an example of the short-circuit current increasing gradient (di/dt), increasing gradient IS1 in the first step is shown.

When the set voltage is equal to the output voltage, for example, short-circuit current increasing gradient IS1 in the first step is 150 A/ms, i.e. a single value, as shown in FIG. 3. The single value means an initial value of the output voltage, and the initial value of the output voltage is the set voltage herein. However, a case where the output voltage is equal to the set voltage minus α (α=2 V herein) is considered. That is, in the case of output where the output voltage is 2 V smaller than the set voltage, in order to raise the output voltage, as shown in the graph of FIG. 3, short-circuit current increasing gradient IS1 in the first step is 40 A/ms increased from a single value of 150 A/ms to 190 A/ms. Thus, control is performed so as to shorten short-circuit period Ts.

The amount of adjustment can be increased or decreased by multiplying the characteristics shown in FIG. 3 by a coefficient, or other methods.

When short-circuit current gradient IS1 in the first step and short-circuit current increasing gradient IS2 in the second step are changed, the same value may be used for the first step and the second step for the increase or decrease, or the above increasing gradients may be changed separately. For example, only the increasing gradient in the first step is increased or decreased, and that in the second step is unchanged.

FIG. 3 shows an example in the form of absolute values where the short-circuit current increasing gradient is ±20 A/ms per ±1 V of the difference between the output voltage and the set voltage. However, the form of rates of change where the increasing gradient is ±20%/ms per ±1 V may be used.

FIG. 3 shows an example where the relation between the output voltage and the short-circuit current increasing gradient (di/dt) is expressed by a linear function. However, the present invention is not limited to this example. The relation may be expressed by a function other than a linear function, such as a quadratic curve, as long as the increasing gradient has the same sign.

Figure 4:
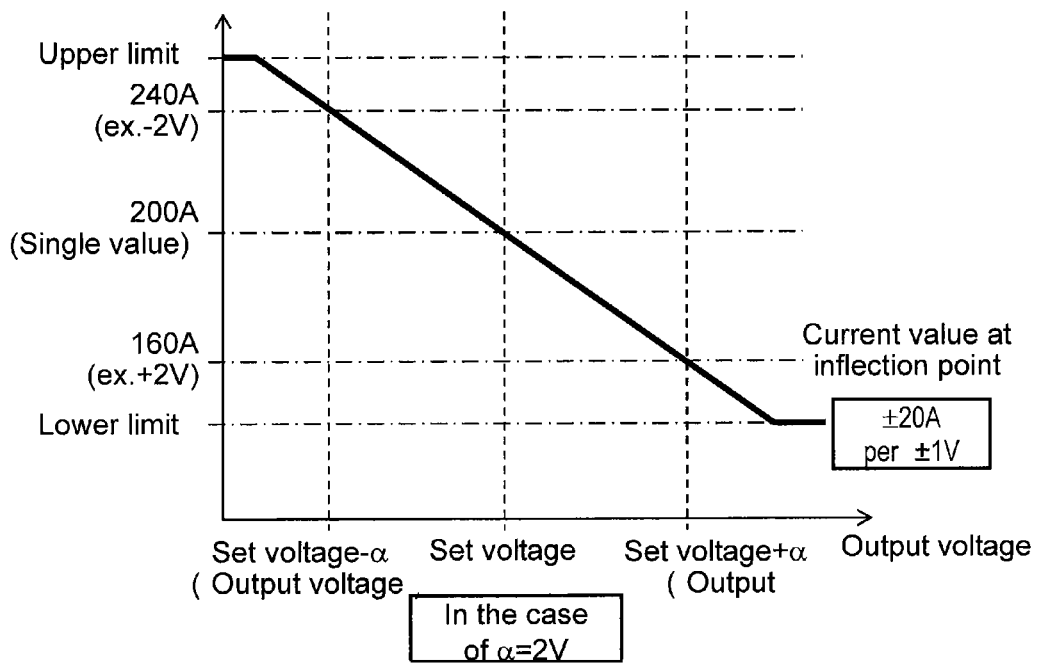
FIG. 4 is a graph showing an example of the relation of a short-circuit current inflection point with respect to the output voltage in accordance with the first exemplary embodiment of the present invention.

Next, a description is provided for the change of ISC at the inflection point of short-circuit current increasing gradient IS1 in the first step and short-circuit current increasing gradient IS2 in the second step with reference to FIG. 4. FIG. 4 is a graph showing an example of the relation of current value ISC at a short-circuit current inflection point with respect to the output voltage in accordance with the first exemplary embodiment of the present invention.

When the set voltage is equal to the output voltage, for example, the current value at the short-circuit current inflection point is 200 A, i.e. a single value, as shown in FIG. 4. However, a case where the output voltage is equal to the set voltage minus α (α=2 V herein) is considered. That is, in the case of output where the output voltage is 2 V smaller than the set voltage, in order to raise the output voltage, current value ISC at the short-circuit current inflection point is 40 A increased from a single value of 200 A to 240 A. Thus, control is performed so as to shorten short-circuit period Ts.

The amount of adjustment can be increased or decreased by multiplying the characteristics shown in FIG. 4 by a coefficient, or other methods.

FIG. 4 shows an example in the form of absolute values where the current value is ±20 A per ±1 V. However, the form of rates of change where the current value is ±20% per ±1 V may be used.

In FIG. 4, the relation between the output voltage and current value ISC at the inflection point is expressed by a linear function. However, the relation may be expressed by a function other than a linear function, such as a quadratic curve, as long as the increasing gradient has the same sign.

When the output voltage is output as a value large or small with respect to the set voltage as shown in FIG. 3 and FIG. 4, short-circuit current increasing gradient IS1 in the first step from P2 to P3, short-circuit current increasing gradient IS2 in the second step from P3 to P4, and current value ISC at the short-circuit current inflection point at time point P3, are changed in accordance with this output.

As shown in FIG. 3 and FIG. 4, an upper limit and a lower limit may be set for short-circuit current increasing gradient IS1 in the first step, short-circuit current increasing gradient IS2 in the second step, and current value ISC at the inflection point. This can prevent excessive adjustment. If no upper limit or lower limit is set, short-circuit current increasing gradient (di/dt) or ISC at the short-circuit current inflection point fluctuate toward a larger value, which considerably increases spatters and destabilizes the arc.

Short-circuit current increasing gradient IS1 in the first step from P2 to P3, short-circuit current increasing gradient IS2 in the second step from P3 to P4, and current value ISC at the short-circuit current inflection point at P3 are set based on at least one of the following values: the value of the difference between the output voltage and the set voltage, the diameter of a consumable electrode wire to be fed, the type of the wire, the extension length of the wire, the shielding gas to be supplied, and the set current value of the welding current.

Alternatively, the arc welding method of the present invention may be the following controlling method. As the short-circuit current increasing gradient (di/dt) corresponding to the set current, short-circuit current increasing gradient IS1 in the first step, and short-circuit current increasing gradient IS2 in the second step following short-circuit current increasing gradient IS1 in the first step that correspond to the set current are determined. Next, based on the difference between the set voltage and the output voltage, short-circuit current increasing gradient IS1 in the first step and short-circuit current increasing gradient IS2 in the second step are temporally changed such that the voltage value of the output voltage is matched with the voltage value of the set voltage.

This method allows the output voltage to be matched with the set voltage more precisely, thereby controlling the welding voltage more stably.

Alternatively, short-circuit current increasing gradient IS1 in the first step may be different from short-circuit current increasing gradient IS2 in the second step.

With this method, short-circuit period Ts can be set to a desired time.

Alternatively, short-circuit current increasing gradient IS1 in the first step may be larger than short-circuit current increasing gradient IS2 in the second step.

With this method, short-circuit period Ts can be set to a desired time.

Alternatively, current value ISC at the inflection point at which short-circuit current increasing gradient IS1 in the first step changes to short-circuit current increasing gradient IS2 in the second step may be determined so as to correspond to the set current, and current value ISC at the inflection point may be temporally changed in accordance with the value of the difference between the output voltage and the set voltage.

This method can prevent a large increase in spatters and an unstable arc. Thereby, a stable arc welding method can be implemented.

Alternatively, the following method can be used. When the output voltage is smaller than the set voltage, current value ISC at the inflection point is changed so as to be larger than current value ISC at the inflection point corresponding to the set current. Further, when the output voltage is larger than the set voltage, current value ISC at the inflection point is changed so as to be smaller than current value ISC at the inflection point corresponding to the set current.

This method can prevent a large increase in spatters and an unstable arc. Thereby, a stable arc welding method can be implemented.

Alternatively, the following method can be used. Current value ISC at the inflection point is changed in proportion to an absolute value corresponding to the value of the difference between the set voltage and the output voltage, or changed to a value that is based on the rate of change corresponding to the value of the difference between the set voltage and the output voltage.

This method can prevent a large increase in spatters and an unstable arc. Thereby, a stable arc welding method can be implemented.

Figure 5:
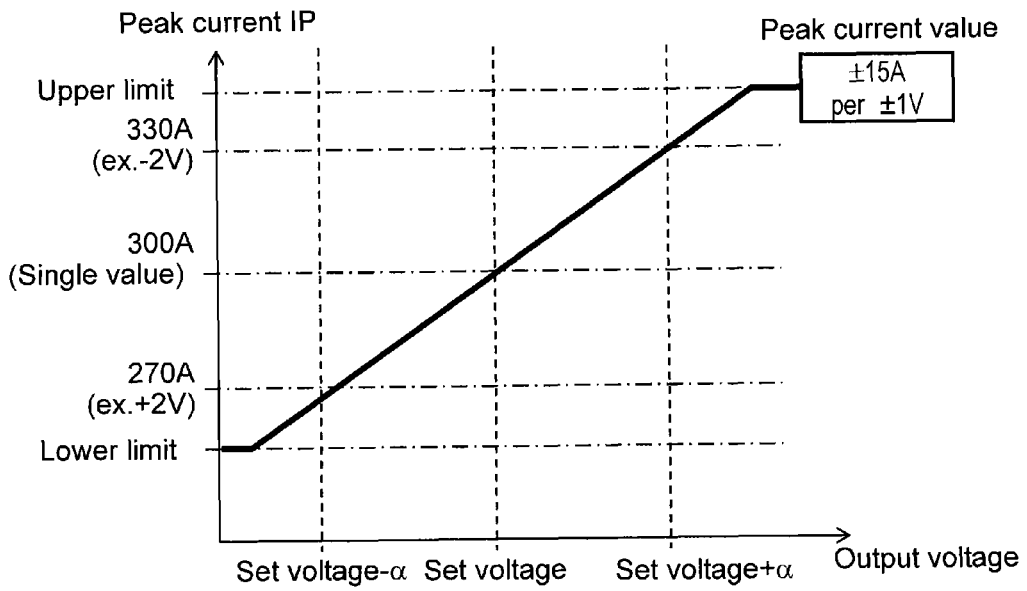
FIG. 5 is a graph showing an example of the relation of a peak current value with respect to the output voltage in accordance with the first exemplary embodiment of the present invention.

Next, a description is provided for the change of peak current IP in arc period Ta with reference to FIG. 5. FIG. 5 is a graph showing an example of the relation of a current value of peak current IP with respect to the output voltage in accordance with the first exemplary embodiment of the present invention.

When the set voltage is equal to the output voltage, for example, the current value of peak current IP is 300 A, i.e. a single value, as shown in FIG. 5. However, a case where the output voltage is equal to the set voltage plus α (α=2 V herein) is considered. That is, in the case of output where the output voltage is 2 V larger than the set voltage, in order to raise the output voltage, the current value of the peak current is 30 A increased from a single value of 300 A to 330 A. Thus, control is performed so as to lengthen arc period Ta.

The amount of adjustment can be increased or decreased by multiplying the characteristics shown in FIG. 5 by a coefficient, or other methods.

FIG. 5 shows an example in the form of absolute values where the current value is ±15 A per ±1 V. However, the form of rates of change where the current value is ±10% per ±1 V may be used.

In FIG. 5, the relation between the output voltage and peak current IP is expressed by a linear function. However, the relation may be expressed by a function other than a linear function, such as a quadratic curve, as long as the increasing gradient has the same sign.

Figure 6:
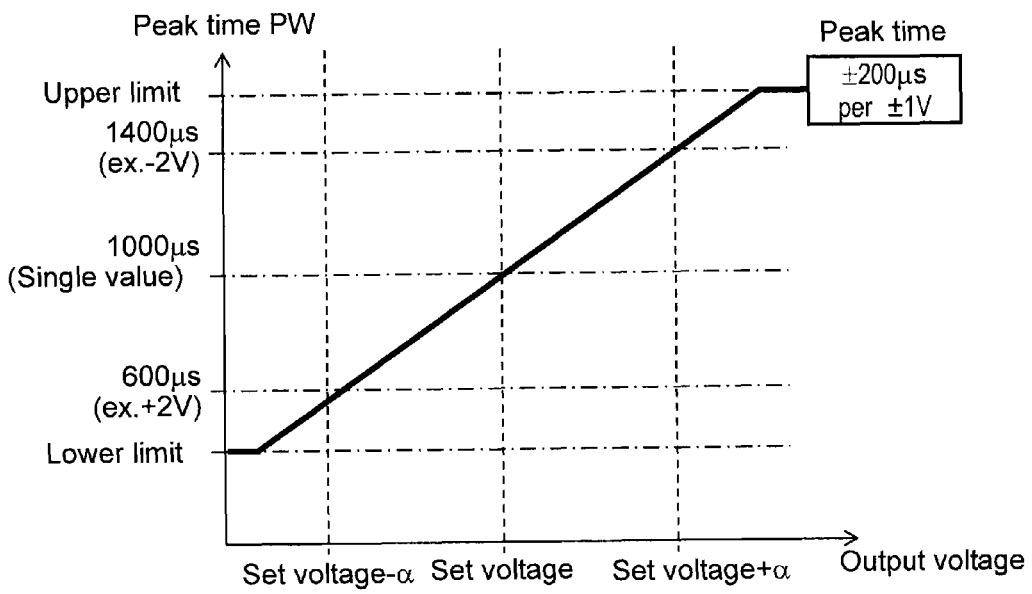
FIG. 6 is a graph showing an example of the relation of a peak current time with respect to the output voltage in accordance with the first exemplary embodiment of the present invention.

Next, a description is provided for the change of peak current time PW in arc period Ta with reference to FIG. 6. FIG. 6 is a graph showing an example of the relation of peak current time PW with respect to the output voltage in accordance with the first exemplary embodiment of the present invention.

When the set voltage is equal to the output voltage, for example, the time value of the peak current time is 1000 µs, i.e. a single value, as shown in FIG. 6. However, a case where the output voltage is equal to the set voltage plus α (α=2 V herein) is considered. That is, in the case of output where the output voltage is 2 V larger than the set voltage, in order to raise the output voltage, the time value of the peak current time is 400 µs increased from a single value of 1000 µs to 1400 µs. Thus, control is performed so as to lengthen arc period Ta.

The amount of adjustment can be increased or decreased by multiplying the characteristics shown in FIG. 6 by a coefficient, or other methods.

FIG. 6 shows an example in the form of absolute values where the time value is ±200 µs per ±1 V. However, the form of rates of change where the time value is ±20% per ±1 V may be used.

In FIG. 6, the relation between the output voltage and peak current time PW is expressed by a linear function. However, the relation may be expressed by a function other than a linear function, such as a quadratic curve, as long as the increasing gradient has the same sign.

When the output voltage is output as a value large or small with respect to the set voltage as shown in FIG. 5 and FIG. 6, peak current IP and peak current time PW from P5 to P6 are changed in accordance with the output voltage.

As shown in FIG. 5 and FIG. 6, an upper limit and a lower limit may be set for each of the values of peak current IP and peak current time PW. This can prevent excessive adjustment. If no upper limit or lower limit is set, peak current IP and peak current time PW excessively fluctuate such that peak current IP and peak current time PW increase. This can considerably increase spatters or destabilize the arc.

Peak current IP and peak current time PW from P5 to P6, and the values of peak current IP and peak current time PW from P5 to P6 are set based on at least one of the following values: the value of the difference between the output voltage and the set voltage, the diameter of a consumable electrode wire to be fed, the type of the wire, the extension length of the wire, the shielding gas to be supplied, and the set current value of the welding current.

As described above, the automatic adjustment shown in this embodiment is made so as to control short-circuit current gradient IS1 in the first step, short-circuit current increasing gradient IS2 in the second step, current value ISC at the inflection point, peak current IP and base current IB in arc period Ta, and peak current time PW. This can control the ratio between short-circuit period Ts and arc period Ta, and allows the output voltage to be matched with the set voltage easily.

All parameters are not necessarily used for the constant voltage control, and only necessary parameters can be used for the control.

That is, the arc welding method of the present invention may be a method for determining the current value in the peak period in arc period Ta and the current value in the base period in arc period Ta corresponding to the set current, and temporally changing the current value in the peak period and the current value in the base period in accordance with the value of the difference between the set voltage and the output voltage.

This method can control the welding voltage stably.

Alternatively, the following method can be used. When the output voltage is smaller than the set voltage, the current value in the peak period and the current value in the base period are changed so as to be larger than the current value in the peak period and the current value in the base period corresponding to the set current. Further, when the output voltage is larger than the set voltage, the current value in the peak period and the current value in the base period are changed so as to be smaller than the current value in the peak period and the current value in the base period corresponding to the set current.

This method can control the welding voltage more stably.

Alternatively, the arc welding method may be a method for changing the current value in the peak period and the current value in the base period to absolute values corresponding to the value of the difference between the set voltage and the output voltage, or changing to values that are based on the rate of change corresponding to the value of the difference between the set voltage and the output voltage.

This method can control the welding voltage more stably.

Alternatively, the arc welding method may be a method for determining the time of the peak period in the arc period corresponding to the set current, and changing the time of the peak period in accordance with the value of the difference between the set voltage and the output voltage.

This method can control the welding voltage more stably. This method can also prevent a large increase in spatters and an unstable arc. Thereby, a stable arc welding method can be implemented.

Alternatively, the following method can be used. When the output voltage is smaller than the set voltage, the time of the peak period in arc period Ta is changed so as to be longer than the time of the peak period in arc period Ta corresponding to the set current. When the output voltage is larger than the set voltage, the time of the peak period in arc period Ta is changed so as to be shorter than the time of the peak period in arc period Ta corresponding to the set current.

This method can control the welding voltage more stably. This method can also prevent a large increase in spatters and an unstable arc. Thereby, a stable arc welding method can be implemented.

Alternatively, the arc welding method may be a method for changing the time of the peak period in arc period Ta to an absolute value corresponding to the value of the difference between the set voltage and the output voltage, or changing to a value that is based on the rate of change corresponding to the value of the difference between the set voltage and the output voltage.

This method can prevent a large increase in spatters and an unstable arc. Thereby, a stable arc welding method can be implemented.

Alternatively, the arc welding method may be a method for welding by:
  setting a welding wire feeding speed corresponding to the set current as an average feeding speed; and
  periodically generating a short-circuit state and an arc state by periodically repeating wire feeding in a forward direction and in a reverse direction at a predetermined frequency with a predetermined amplitude.

This method allows the output voltage to be matched with the set voltage more precisely, thereby controlling the welding voltage more stably.

Next, a description is provided for an arc welding apparatus for performing control by the above method of the first exemplary embodiment.

Figure 7:
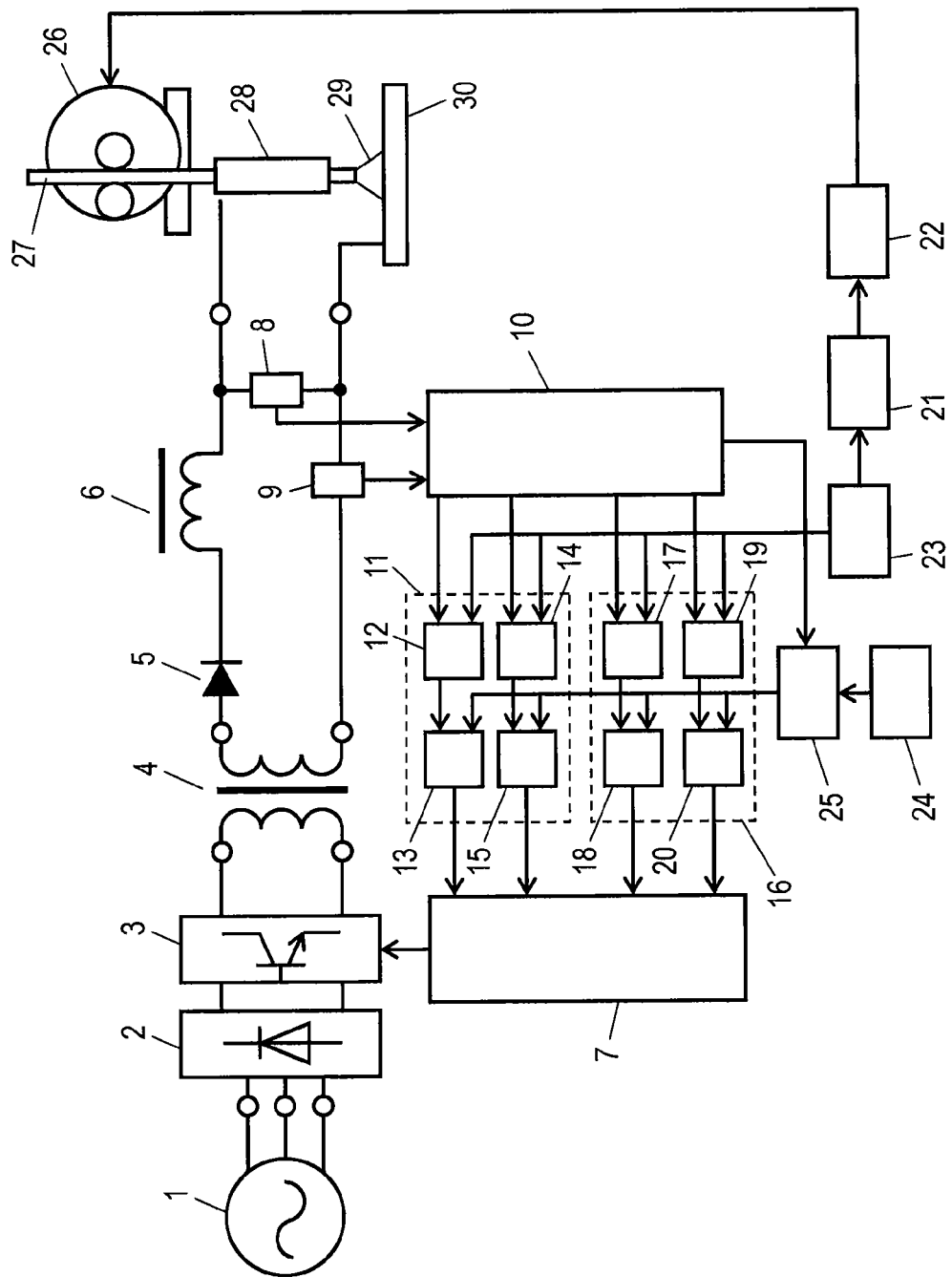
FIG. 7 is a configuration diagram showing a schematic configuration of an arc welding apparatus in accordance with the first exemplary embodiment of the present invention.

FIG. 7 is a configuration diagram showing a schematic configuration of an arc welding apparatus in accordance with the first exemplary embodiment of the present invention. As shown in FIG. 7, the arc welding apparatus of the first exemplary embodiment is an apparatus for welding by repeating an arc state and a short-circuit state between welding wire 27 as a consumable electrode and object to be welded 30. Feeding of welding wire 27 is periodically repeated in a forward direction and in a reverse direction by wire feeding motor 26. Welding wire 27 penetrates through tip 28 and discharges welding arc 29 from the top end thereof to object to be welded 30.

This arc welding apparatus has switching element 3, welding voltage detector 8, status detector 10, short-circuit controller 11, arc controller 16, set current setting section 23, and set voltage setting section 24. Switching element 3 controls a welding output. Welding voltage detector 8 detects a welding voltage. Status detector 10 detects a short-circuit state or an arc state, based on the output from welding voltage detector 8. Upon receiving a short-circuit signal from status detector 10, short-circuit controller 11 controls a short-circuit current in short-circuit period Ts. Upon receiving an arc signal from status detector 10, arc controller 16 controls an arc voltage in arc period Ta. Set current setting section 23 sets a set current. Set voltage setting section 24 sets a set voltage. Short-circuit controller 11 has increasing gradient base setting section 12 and increasing gradient controller 13. Short-circuit controller 11 changes a short-circuit current increasing gradient (di/dt), based on the difference between the set voltage set in set voltage setting section 24 and the voltage detected in welding voltage detector 8.

This configuration allows the output voltage to be matched with the set voltage, thereby controlling the welding voltage stably.

The arc welding apparatus of the first exemplary embodiment has the following structure, for example. As shown in FIG. 7, in the arc welding apparatus, electric power from input power supply 1 is rectified in primary rectifier 2, and converted to alternating voltage by switching element 3. The alternating voltage is lowered by transformer 4, rectified by secondary rectifier 5 and DCL 6, i.e. an inductor, and applied between welding wire 27 and object to be welded 30. The arc welding apparatus also has driver 7 for controlling switching element 3, welding voltage detector 8 connected between welding power supply output terminals, and welding current detector 9 for detecting a welding output current. The arc welding apparatus also has status detector 10, short-circuit controller 11, and arc controller 16. The status detector determines whether a short circuit or an arc occurs, based on a signal from welding voltage detector 8. The short-circuit controller controls the short-circuit current in short-circuit period Ts, upon receiving a short-circuit signal from status detector 10. Arc controller 16 controls the arc voltage in arc period Ta, upon receiving an arc signal from status detector 10. The arc welding apparatus also has set current setting section 23 for setting a current, set voltage setting section 24 for setting a voltage, and difference calculator 25 for obtaining a difference between the output voltage and the set voltage set in set voltage setting section 24.

First, hereinafter, a description is provided for wire feeding control in this arc welding apparatus.

Frequency base setting section 21 for wire feeding and amplitude base setting section 22 for wire feeding output a wire feeding speed at which a forward feed and a reverse feed in a sine waveform are repeated at a predetermined frequency with a predetermined amplitude, with respect to an average feeding speed, i.e. a wire feeding speed corresponding to the set current value in set current setting section 23.

The relation of the average feeding speed, the predetermined frequency, and the predetermined amplitude with respect to the set current is stored in a storage, for example, which is not shown, as a table or a formula, and these values are determined based on the set current.

Next, hereinafter, a description is provided for welding control in the arc welding apparatus.

Welding voltage detector 8 is connected between the welding power supply output terminals, and outputs a signal corresponding to the detected voltage to status detector 10. Status detector 10 determines, based on the signal from welding voltage detector 8, whether the welding output voltage is equal to or larger than a predetermined value, or smaller than the predetermined value. Based on this determination result, the status detector determines whether welding wire 27 short-circuits in contact with object to be welded 30 or a welding arc occurs in a non-contact state, and outputs a determination signal.

Short-circuit controller 11 has increasing gradient base setting section 12, inflection point base setting section 14, increasing gradient controller 13, and inflection point controller 15. Based on the difference between the set voltage set in set voltage setting section 24 and the voltage detected in welding voltage detector 8, short-circuit controller 11 changes at least one of short-circuit current increasing gradient IS1 in the first step, short-circuit current increasing gradient IS2 in the second step, and current value ISC at the inflection point. Here, based on the set current set by the operator, increasing gradient base setting section 12 determines short-circuit current increasing gradient ($di_1/dt$) in the first step and short-circuit current increasing gradient ($di_2/dt$) in the second step. Based on the set current set by the operator, inflection point base setting section 14 determines current value ISC at the inflection point at which the short-circuit current increasing gradient changes from the short-circuit current increasing gradient ($di_1/dt$) in the first step to the short-circuit current increasing gradient ($di_2/dt$) in the second step. Based on the difference between the voltage set in set voltage setting section 24 and the voltage detected in welding voltage detector 8, increasing gradient controller 13 changes the short-circuit current increasing gradient ($di_1/dt$) in the first step and the short-circuit current increasing gradient ($di_2/dt$) in the second step set in increasing gradient base setting section 12. Based on the difference between the voltage set in set voltage setting section 24 and the voltage detected in welding voltage detector 8, inflection point controller 15 changes current value ISC at the inflection point of the short-circuit current increasing gradients determined in inflection point base setting section 14.

This structure allows the output voltage to be matched with the set voltage precisely, thereby controlling the welding voltage more stably.

The relation of short-circuit current increasing gradient ($di_1/dt$) in the first step, short-circuit current increasing gradient ($di_2/dt$) in the second step and the inflection point with respect to the set current is stored in a storage, for example, which is not shown, as a table or a formula, and theses values are determined based on the set current.

Next, a description is provided for arc control after the determination of status detector 10.

Arc controller 16 of FIG. 7 has current base setting section 17, time base setting section 19, current controller 18, and time controller 20. Arc controller 16 changes at least one of the current value in the peak period and the current value in the base period in arc period Ta, and the time of the peak period in arc period Ta. Here, current base setting section 17 sets the current in the peak period and in the base period, based on the set current set by the operator. Time base setting section 19 sets the time of the peak period, based on the set current set by the operator. Current controller 18 changes the current in the peak period and in the base period set in current base setting section 17, based on the difference between the voltage set in set voltage setting section 24 and the voltage detected in welding voltage detector 8. Time controller 20 changes the time of the peak period set in the time base setting section for the peak period, based on the difference between the voltage set in the set voltage setting section and the voltage detected in the welding voltage detector.

This structure can control the welding voltage more stably. This stabilizes the arc and thus can reduce spatters.

The relation of the peak current, the base current, and the peak current time with respect to the set current is stored in a storage, for example, which is not shown, as a table or a formula, and these values are determined based on the set current.

The difference between welding voltage detector 8 and set voltage setting section 24 is monitored in difference calculator 25 for calculating a difference between the output voltage and the set voltage. Short-circuit controller 11 receives a voltage difference value from difference calculator 25. Short-circuit current increasing gradient controller 13 and short-circuit current inflection point controller 15 output values changed from the values from increasing gradient base setting section 12 and inflection point base setting section 14, to driver 7. Thus, short-circuit current increasing gradient IS1 in the first step, short-circuit current increasing gradient IS2 in the second step, and current value ISC at the short-circuit current inflection point are controlled, so that the short-circuit current is controlled.

Arc controller 16 receives the voltage difference value from difference calculator 25. Current controller 18 and time controller 20 output values changed from the values from current base setting section 17 and time base setting section 19, to driver 7. Thus, the peak current, the base current, and the peak current time are controlled, so that the arc current is controlled.

The arc welding apparatus as described above temporally makes automatic adjustment on the values of the short-circuit current increasing gradient (di/dt), the short-circuit current inflection point, the peak current, the base current, and the peak current time. This can automatically adjust the ratio between short-circuit period Ts and arc period Ta, thereby allowing the output voltage to temporally and automatically follow the set voltage.

Each element constituting the arc welding apparatus shown in FIG. 7 may be formed separately, or a plurality of elements may be combined.

In the example described in the first exemplary embodiment, the short-circuit current increasing gradient (di/dt), the short-circuit current inflection point, the peak current, the base current, and the peak current time are stored in a storage so as to correspond to the set current. However, the set current is in proportional relation to the wire feeding speed and the wire feeding amount. Therefore, the short-circuit current increasing gradient ($di_1/dt$) in the first step, the short-circuit current increasing gradient (di$_2$/dt) in the second step, the short-circuit current inflection point, the peak current, the base current, and the peak current time may be stored in a storage, which is not shown, such that these values correspond to the wire feeding speed or the wire feeding amount, instead of the set current.

Second Exemplary Embodiment

Figure 8:
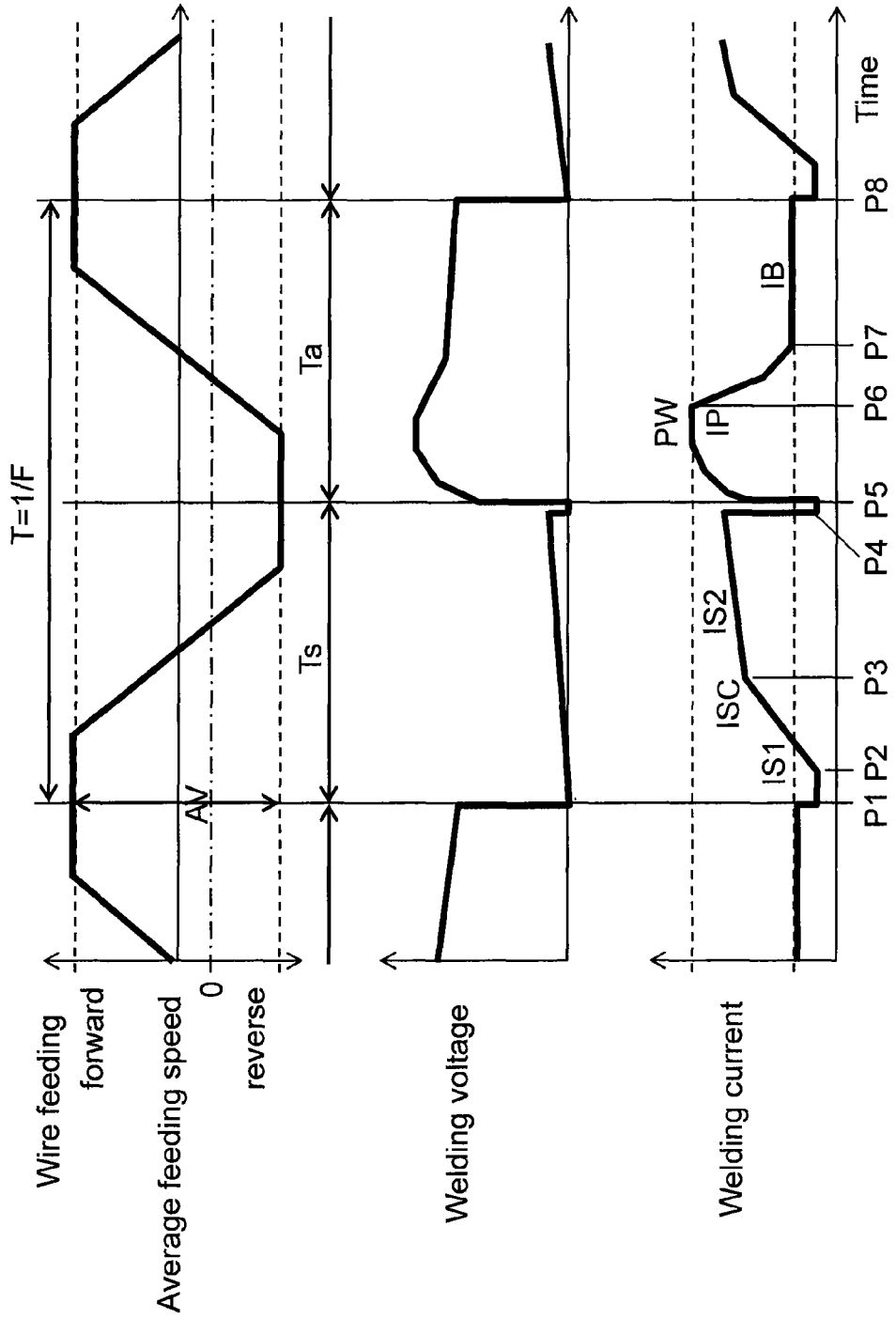
FIG. 8 is a diagram showing time waveforms of a wire feeding speed, a welding voltage, and a welding current in accordance with a second exemplary embodiment of the present invention.
Figure 9:
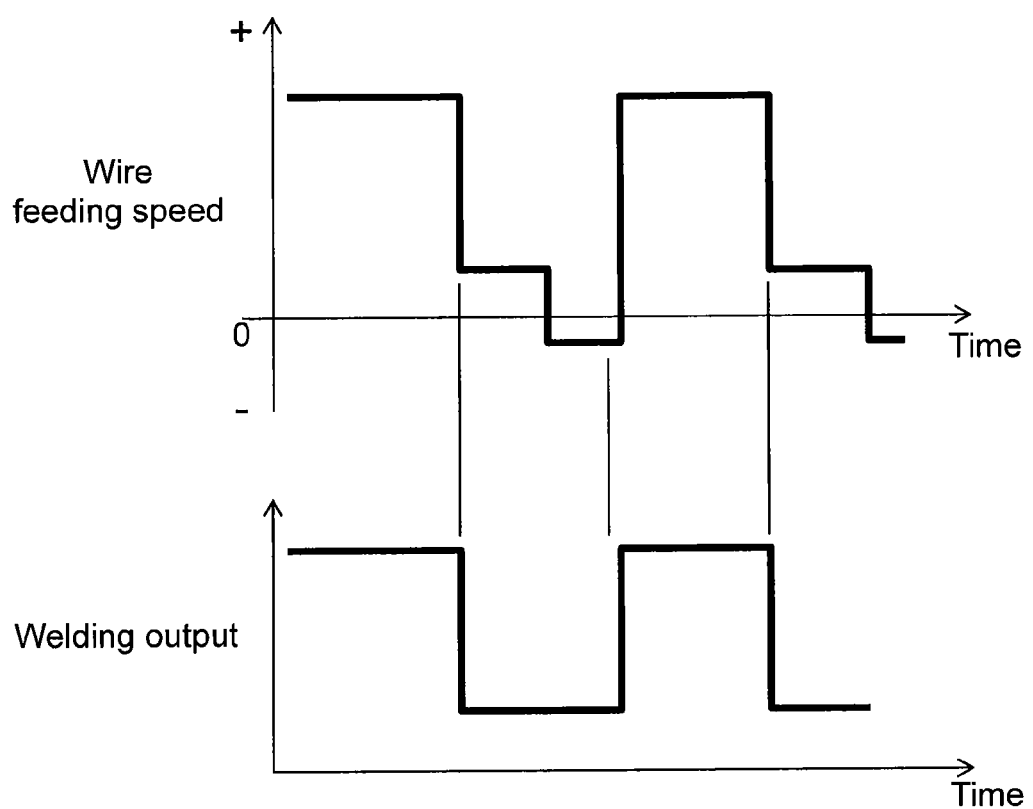
FIG. 9 is a diagram showing time waveforms of a wire feeding speed and a welding output of a conventional example.

FIG. 8 is a diagram showing time waveforms of a wire feeding speed, a welding voltage, and a welding current in accordance with the second exemplary embodiment of the present invention. The second exemplary embodiment is different from the first exemplary embodiment mainly in that the wire feeding is based on a trapezoidal waveform as shown in FIG. 8 instead of a sine waveform.

When wire feeding is controlled such that a forward feed and a reverse feed are periodically repeated at predetermined frequency F with predetermined amplitude AV, such a trapezoidal waveform can provide the performance similar to that of the sine waveform.

The control method and the welding apparatus are similar to those of the first exemplary embodiment, and thus the description is omitted.

As described above, in accordance with the present invention, in the control method for periodically increasing or decreasing a wire feeding speed, short-circuit current increasing gradient IS1 in a first step, short-circuit current increasing gradient IS2 in a second step, current value ISC at an inflection point, the current in a peak period and in a base period, and the time of the peak period are controlled. Thereby, an output voltage can be matched with a set voltage.

Further, it is considered that, arc welding is unlikely to cause an unstable arc even when the state of the arc welding is changed by disturbances, such as variations in the extension length, and gaps.

It is also considered that the load on the peripheral components around the motor, such as a feeding motor and gears, is small because an increase/decrease in the wire feeding speed is based on a sine waveform or a trapezoidal waveform.

INDUSTRIAL APPLICABILITY

The present invention can minimize the problems caused by an unstable arc, such as bead defects, an increase in spatters, and lack of penetration. The unstable arc results from disturbances, such as an increase in the welding speed, variations in the extension length, and gaps between the objects to be welded. Thus, the present invention can suppress adverse effects on production efficiency and working environment. Therefore, the present invention is industrially useful as a welding method and a welding apparatus that are used in the industries, such as an automobile industry, where thin plates are mainly welded at high speed by consumable electrode type arc welding.

REFERENCE MARKS IN THE DRAWINGS

1 Input power supply
2 Primary rectifier
3 Switching element
4 Transformer
5 Secondary rectifier
6 DCL
7 Driver
8 Welding voltage detector
9 Welding current detector
10 Status detector
11 Short-circuit controller
12 Increasing gradient base setting section
13 Increasing gradient controller
14 Inflection point base setting section
15 Inflection point controller
16 Arc controller
17 Current base setting section
18 Current controller
19 Time base setting section
20 Time controller
21 Frequency base setting section
22 Amplitude base setting section
23 Set current setting section
24 Set voltage setting section
25 Difference calculator
26 Wire feeding motor
27 Welding wire
28 Tip
29 Welding arc
30 Object to be welded

The invention claimed is:

1. An arc welding method for welding using a welding wire as a consumable electrode by repeating a short-circuit state and an arc state, the arc welding method comprising:
a determining step for determining an increasing gradient of a short-circuit current corresponding to a set current;
a calculating step for calculating a difference between an output voltage and a set voltage; and
a changing step for temporally changing the increasing gradient of the short-circuit current such that the output voltage is matched with the set voltage, based on the difference between the set voltage and the output voltage, wherein
when the output voltage is smaller than the set voltage in the calculating step, the increasing gradient of the short-circuit current is changed so as to be steeper than the increasing gradient of the short-circuit current corresponding to the set current in the changing step, and the short-circuit state in the repeating of the short-circuit state and the arc state is shortened, and
when the output voltage is larger than the set voltage in the calculating step, the increasing gradient of the short-circuit current is changed so as to be more gradual than the increasing gradient of the short-circuit current corresponding to the set current in the changing step, and the short-circuit state in the repeating of the short-circuit state and the arc state is lengthened.

2. The arc welding method of claim 1, wherein, in the changing step, the increasing gradient of the short-circuit current is changed in proportion to an absolute value corresponding to a value of the difference between the set voltage and the output voltage, or changed to a value that is based on a rate of change corresponding to the value of the difference between the set voltage and the output voltage.

3. The arc welding method of claim 1, wherein at least one of an upper limit and a lower limit is set for the increasing gradient of the short-circuit current.

4. The arc welding method of claim 1, wherein
in the determining step, determining an increasing gradient of short-circuit current in a first step, and an increasing gradient of short-circuit current in a second step following the increasing gradient of the short-circuit current in the first step, and
in the changing step, based on a value of the difference between the set voltage and the output voltage, temporally changing the increasing gradient of the short-circuit current in the first step and the increasing gradient of the short-circuit current in the second step.

5. The arc welding method of claim 4, wherein the increasing gradient of short-circuit current in the first step is different from the increasing gradient of the short-circuit current in the second step.

6. The arc welding method of claim 5, wherein the increasing gradient of the short-circuit current in the first step is larger than the increasing gradient of the short-circuit current in the second step.

7. The arc welding method of claim 4, wherein
a current value at an inflection point at which the increasing gradient of the short-circuit current in the first step changes to the increasing gradient of the short-circuit current in the second step is determined so as to correspond to the set current, and
the current value at the inflection point is temporally changed in accordance with the value of the difference between the output voltage and the set voltage.

8. The arc welding method of claim 7, wherein
when the output voltage is smaller than the set voltage in the calculating step, the current value at the inflection point is changed so as to be larger than the current value at the inflection point corresponding to the set current in the changing step, and
when the output voltage is larger than the set voltage in the calculating step, the current value at the inflection point is changed so as to be smaller than the current value at the inflection point corresponding to the set current in the changing step.

9. The arc welding method of claim 7, wherein, in the changing step, the current value at the inflection point is changed in proportion to an absolute value corresponding to the value of the difference between the set voltage and the output voltage, or changed to a value that is based on a rate of change corresponding to the value of the difference between the set voltage and the output voltage.

10. The arc welding method of claim 7, wherein an upper limit and a lower limit are set for the current value at the inflection point.

11. The arc welding method of claim 1, wherein
a current value in a peak period in an arc period and a current value in a base period in the arc period corresponding to the set current are determined in the determining step, and
the current value in the peak period and the current value in the base period are temporally changed in accordance with the value of the difference between the set voltage and the output voltage in the changing step.

12. The arc welding method of claim 11, wherein
when the output voltage is smaller than the set voltage in the calculating step, the current value in the peak period and the current value in the base period are changed so as to be larger than the current value in the peak period and the current value in the base period corresponding to the set current in the changing step, and
when the output voltage is larger than the set voltage in the calculating step, the current value in the peak period and the current value in the base period are changed so as to be smaller than the current value in the peak period and the current value in the base period corresponding to the set current in the changing step.

13. The arc welding method of claim 11, wherein, in the changing step, the current value in the peak period and the current value in the base period are changed to absolute values corresponding to the value of the difference between the set voltage and the output voltage, or changed to values that are based on a rate of change corresponding to the value of the difference between the set voltage and the output voltage.

14. The arc welding method of claim 11, wherein an upper limit and a lower limit are set for each of the current value in the peak period and the current value in the base period.

15. The arc welding method of claim 1, wherein
a time of a peak period in an arc period corresponding to the set current is determined in the determining step, and
the time of the peak period is changed in accordance with the value of the difference between the set voltage and the output voltage in the changing step.

16. The arc welding method of claim 15, wherein
when the output voltage is smaller than the set voltage in the calculating step, the time of the peak period in the arc period is changed so as to be longer than the time of the peak period in the arc period corresponding to the set current in the changing step, and
when the output voltage is larger than the set voltage in the calculating step, the time of the peak period in the arc period is changed so as to be shorter than the time of the peak period in the arc period corresponding to the set current in the changing step.

17. The arc welding method of claim 15, wherein, in the changing step, the time of the peak period in the arc period is changed to an absolute value corresponding to the value of the difference between the set voltage and the output voltage, or changed to a value that is based on a rate of change corresponding to the value of the difference between the set voltage and the output voltage.

18. The arc welding method of claim 15, wherein an upper limit and a lower limit are set for the time of the peak period in the arc period.

19. The arc welding method of claim 1, wherein the welding is performed by
setting a welding wire feeding speed corresponding to the set current as an average feeding speed; and
periodically generating the short-circuit state and the arc state by periodically repeating wire feeding in a forward direction and in a reverse direction at a predetermined frequency with a predetermined amplitude.

20. An arc welding apparatus for welding by repeating an arc state and a short-circuit state between a welding wire as a consumable electrode and an object to be welded, the arc welding apparatus comprising:
a switching element for controlling a welding output;
a welding voltage detector for detecting an output voltage;
a status detector for detecting the short-circuit state or the arc state, based on an output from the welding voltage detector;
a short-circuit controller for controlling a short-circuit current in a short-circuit period, upon receiving a short-circuit signal from the status detector;
an arc controller for controlling an arc voltage in an arc period, upon receiving an arc signal from the status detector;
a set current setting section for setting a set current;
a set voltage setting section for setting a set voltage; and
a difference calculator for calculating a difference between the set voltage and the output voltage,
wherein the short-circuit controller includes:
an increasing gradient base setting section for determining an increasing gradient of the short-circuit current, based on a set current set by an operator; and
an increasing gradient controller for changing the increasing gradient of the short-circuit current determined in the increasing gradient base setting section, based on a difference between the set voltage and the output voltage, wherein the short-circuit controller changes the increasing gradient of the short-circuit current, based on the difference between the set voltage and the output voltage, wherein when the output voltage is smaller than the set voltage in the calculating step, the increasing gradient of the short-circuit current is changed so as to be steeper than the increasing gradient of the short-circuit current corresponding to the set current in the changing step, and the short-circuit state in the repeating of the short-circuit state and the arc state is shortened, and when the output voltage is larger than the set voltage in the calculating step, the increasing gradient of the short-circuit current is changed so as to be more gradual than the increasing gradient of the short-circuit current corresponding to the set current in the changing step, and the short-circuit state in the repeating of the short-circuit state and the arc state is lengthened.

21. An arc welding apparatus for welding by repeating an arc state and a short-circuit state between a welding wire as a consumable electrode and an object to be welded, the arc welding apparatus comprising:
  a switching element for controlling a welding output;
  a welding voltage detector for detecting an output voltage;
  a status detector for detecting the short-circuit state or the arc state, based on an output from the welding voltage detector;
  a short-circuit controller for controlling a short-circuit current in a short-circuit period, upon receiving a short-circuit signal from the status detector;
  an arc controller for controlling an arc voltage in an arc period, upon receiving an arc signal from the status detector;
  a set current setting section for setting a set current;
  a set voltage setting section for setting a set voltage; and
  a difference calculator for calculating a difference between the set voltage and the output voltage,
  wherein the short-circuit controller includes:
    an increasing gradient base setting section for determining an increasing gradient of the short-circuit current in a first step and an increasing gradient of the short-circuit current in a second step, based on a set current set by an operator;
    an inflection point base setting section for determining an inflection point at which the increasing gradient of the short-circuit current in the first step changes to the increasing gradient of the short-circuit current in the second step, based on the set current set by the operator;
    an increasing gradient controller for changing the increasing gradient of the short-circuit current in the first step and the increasing gradient of the short-circuit current in the second step determined in the increasing gradient base setting section, based on a difference between the set voltage and the output voltage; and
    an inflection point controller for changing the inflection point of the short-circuit current determined in the inflection point base setting section, based on the difference between the set voltage and the output voltage,
  wherein based on the difference between the set voltage and the output voltage, the short-circuit controller changes at least one of the increasing gradient of the short-circuit current in the first step, the increasing gradient of the short-circuit current in the second step, and a current value at the inflection point, and wherein when the output voltage is smaller than the set voltage in the calculating step, the increasing gradient of the short-circuit current is changed so as to be steeper than the increasing gradient of the short-circuit current corresponding to the set current in the changing step, and the short-circuit state in the repeating of the short-circuit state and the arc state is shortened, and when the output voltage is larger than the set voltage in the calculating step, the increasing gradient of the short-circuit current is changed so as to be more gradual than the increasing gradient of the short-circuit current corresponding to the set current in the changing step, and the short-circuit state in the repeating of the short-circuit state and the arc state is lengthened.

22. The arc welding apparatus of claim 20, wherein the arc controller includes:
  a current base setting section for setting a current in the peak period and in the base period, based on the set current set by the operator;
  a time base setting section for setting a time of the peak period, based on the set current set by the operator;
  a current controller for changing the current in the peak period and in the base period set in the current base setting section, based on the difference between the set voltage and the output voltage; and
  a time controller for changing the time of the peak period set in the time base setting section for the peak period, based on the difference between the set voltage and the output voltage, and
  the arc controller changes at least one of the current value in the peak period and the current value in the base period in the arc period, and the time of the peak period in the arc period.

23. The arc welding apparatus of claim 20 further comprising:
  a frequency base setting section and an amplitude base setting section for wire feeding, the frequency base setting section and the amplitude base setting section controlling feeding of the welding wire such that the wire feeding is periodically repeated in a forward direction and in a reverse direction in a sine waveform or in a trapezoidal waveform,
  wherein the welding is performed by
  setting a welding wire feeding speed corresponding to the set current as an average feeding speed; and
  periodically generating the short-circuit state and the arc state by periodically repeating the wire feeding in the forward direction and in the reverse direction at a predetermined frequency with a predetermined amplitude.

24. The arc welding apparatus of claim 21, wherein the arc controller includes:
  a current base setting section for setting a current in the peak period and in the base period, based on the set current set by the operator;
  a time base setting section for setting a time of the peak period, based on the set current set by the operator;
  a current controller for changing the current in the peak period and in the base period set in the current base setting section, based on the difference between the set voltage and the output voltage; and
  a time controller for changing the time of the peak period set in the time base setting section for the peak period, based on the difference between the set voltage and the output voltage, and the arc controller changes at least one of the current value in the peak period and the current value in the base period in the arc period, and the time of the peak period in the arc period.

25. The arc welding apparatus of claim 21 further comprising:

a frequency base setting section and an amplitude base setting section for wire feeding, the frequency base setting section and the amplitude base setting section controlling feeding of the welding wire such that the wire feeding is periodically repeated in a forward direction and in a reverse direction in a sine waveform or in a trapezoidal waveform, wherein the welding is performed by setting a welding wire feeding speed corresponding to the set current as an average feeding speed; and periodically generating the short-circuit state and the arc state by periodically repeating the wire feeding in the forward direction and in the reverse direction at a predetermined frequency with a predetermined amplitude.

* * * * *